United States Patent Office 3,347,874
Patented Oct. 17, 1967

3,347,874
5-NITROFURYL-2-AMIDOXIMES
Fernand Eloy, Brussels, Belgium, and Chester J. Mirocha, Raleigh, N.C., assignors to Union Carbide Corporation, a corporation of New York
No Drawing. Filed Jan. 9, 1963, Ser. No. 250,240
6 Claims. (Cl. 260—347.7)

The invention relates to novel chemical compounds useful as broad-spectrum bactericides and is particularly concerned with 5-nitrofuryl-2-amidoxime compounds and derivatives thereof having one or two hydrocarbyl substituents on the amide nitrogen.

Our novel compounds can be represented by the general formula (I)
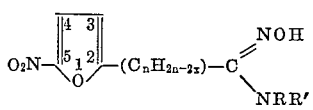

wherein $n$ is an integer from 0 to about 5, inclusive; $x$ is the number of olefinic double bonds in the linkage connecting the nitrofuryl ring structure with the amidoxime groups; and R and R' individually are hydrogen or hydrocarbyl radicals, i.e. radicals composed exclusively of hydrogen and carbon and bonded to the amide nitrogen through a carbon atom of the radical. Exemplary of the said hydrocarbyl radicals are alkyl, alkenyl, alkynyl, cycloalkyl, cycloalkenyl, aryl, alkaryl, and aralkyl. In preferred aspect the total number of carbon atoms in R and R' does not exceed 10.

Thus it can be seen that the compounds within the compass of this invention comprise a 5-nitrofuryl-2 moiety (a)
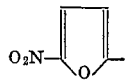

and an amidoxime moiety (b)
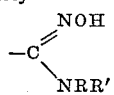

wherein R and R' are defined as before, said moieties (a) and (b) being connected to each other directly or via an alkylene, alkenylene, or alkadienylene linkage, such linkage containing up to about 5 carbon atoms.

As specifically exemplary of our new compounds there can be mentioned, in addition to 5-nitrofuryl-2-amidoxime, N-monoalkyl derivatives thereof such as 5-nitrofuryl-2-N-methylamidoxime,
5-nitrofuryl-2-N-ethylamidoxime,
5-nitrofuryl-2-N-n-propylamidoxime,
5-nitrofuryl-2-N-isopropylamidoxime,
5-nitrofuryl-2-N-butylamidoxime,
5-nitrofuryl-2-N-heptylamidoxime,
5-nitrofuryl-2-N-decylamidoxime, as well as N,N-dialkyl derivatives such as 5-nitrofuryl-2-N,N-dimethylamidoxime,
5-nitrofuryl-2-N-methyl-N-ethylamidoxime,
5-nitrofuryl-2-N,N-diethylamidoxime,
5-nitrofuryl-2-N-methyl-N-n-propylamidoxime,
5-nitrofuryl-2-N,N-di-n-propylamidoxime,
5-nitrofuryl-2-N-methyl-N-isopropylamidoxime,
5-nitrofuryl-2-N,N-di-n-butylamidoxime,
5-nitrofuryl-2-N,N-dipentylamidoxime, and derivatives having cyclic N-substituents such as 5-nitrofuryl-2-N-cyclopentylamidoxime,
5-nitrofuryl-2-N-phenylamidoxime,
5-nitrofuryl-2-N-methyl-N-benzylamidoxime,
5-nitrofuryl-2-N-p-tolylamidoxime, and derivatives containing unsaturated acyclic substituents as in 5-nitrofuryl-2-N-vinylamidoxime,
5-nitrofuryl-2-N-methyl-N-allylamidoxime,
5-nitrofuryl-2-N-ethynylamidoxime, and the like.

Similarly exemplary of our novel compounds are 5-nitrofuryl-2-acetamidoxime,
3-(5-nitrofuryl-2)propionamidoxime,
4-(5-nitrofuryl-2)butyramidoxime,
5-(5-nitrofuryl-2)pentanamidoxime,
3-(5-nitrofuryl-2)acrylamidoxime,
5-(5-nitrofuryl-2)pent-3-enamidoxime, and derivatives thereof having one or two hydrocarbyl substituents on the amide nitrogen, as illustrated above for 5-nitrofuryl-2-amidoxime.

The compounds of this invention can be synthesized from known compounds in a variety of ways. One synthetic route, applicable to making those compounds of our invention having no substituents on the amide nitrogen, i.e. where R and R', above, are both hydrogen, involves the reaction of the corresponding nitrile compound with free hydroxylamine or with hydroxylamine hydrochloride and aqueous base, according to the following scheme:

(1)
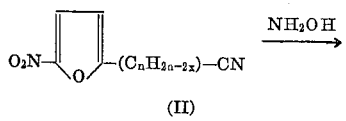

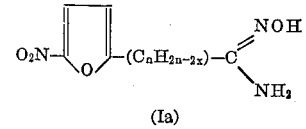

(Ia)

wherein $n$ and $x$ are defined as before.

This reaction is conveniently carried out by dissolving the starting material (II) in a suitable organic solvent, such as methanol, and adding to the resulting solution free hydroxylamine (or hydroxylamine hydrochloride with subsequent addition of base). The reaction proceeds well at temperatures between about 0° C. and 80° C. and the product is recovered as a precipitate which can be purified by the conventional techniques, e.g. recrystallization. The nitrile compounds (II) employed as starting materials in this synthesis are known or can be prepared by means known to the art, e.g. by dehydration with acetic anhydride of the oxime compound corresponding to the desired compounds. Suitable procedures are presented by Dunlop et al., on "The Furans" (Reinhold, N.Y., 1953), and by Ikeda, Ann. Repts. Fac. Pharm. Karayawa Univ. 3, 25–26 (1953), abstracted in CA 50, 10701e (1956). Those compounds of our invention having one or two hydrocarbyl substituents on the said amide nitrogen, i.e. where one or both of R and R', above, are hydrocarbyl, can be prepared from the corresponding 5-nitrofuryl-2-aldoxime compounds by sequential chlorination, to give the corresponding nitrosochloride compound, and addition of suitably substituted amine to give the desired compound. This synthetic route is illustrated as follows, where R, R', $n$, and $x$ are defined as before:

(2)
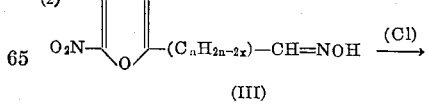

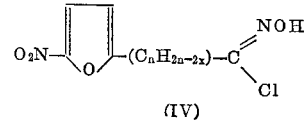

(IV)

(3)

(IV) $\xrightarrow{RR'NH}$ 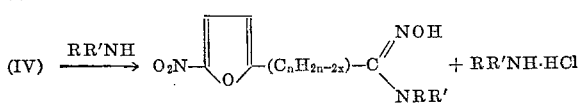 + RR'NH·HCl

Step (2) is accomplished either by direct chlorination or by use of nitrosyl chloride in a suitable inert solvent, e.g. ethyl ether or chloroform or dioxane. Nitrosyl chloride is used in stoichiometric amounts or slight excess and the reaction proceeds well between 0–30° C. The nitrosochloride product is recovered by evaporating the solvent and any excess nitrosyl chloride and purifying the product by the usual techniques, e.g. recrystallization.

Step (3) is carried out in a suitable inert organic solvent reaction medium at temperatures between about 10° C. and about 30° C. At least two moles of amine should be supplied per mole of nitrosochloride compound to take up the evolving HCl. The product amidoxime compound is recovered by filtering the reaction mixture to remove the precipitated HNRR'·HCl salt and evaporating any excess amine and solvent.

It will be seen that suitable amines for use in step (3) respond to the formula

HNRR' where R and R' are defined as before. Such amines are exemplified by methylamine, dimethylamine, cyclopentylamine, aniline, benzylmethylamine, vinylamine, allylmethylamine, and the like, depending on the product desired.

The following examples are illustrative.

*Example I*

Hydroxylamine hydrochloride (222 grams, 3.2 moles), 1500 ml. methanol and 300 ml. water were charged to a 5-liter flask and stirred until homogeneous. 414 grams (3.0 moles) of 5-cyano-2-nitrofuran was then added at 25° C. After the resulting suspension was treated with 270 grams (3.2 moles) of sodium bicarbonate, the mixture was heated at 40–50° C. for 4 hours, diluted with 1000 ml. of water, cooled to 10° C. and filtered. The solid was recrystallized from isopropanol to yield 440 grams of 5-nitrofuryl-2-amidoxime in the form of bright yellow crystals having a melting point of 171–172° C. and the following analysis:

Calculated for $C_5H_5N_3O_4$: C, 35.10; H, 2.95; N, 24.56. Found: C, 35.30; H, 2.94; N, 24.34.

*Example II*

To a solution of 21 grams (0.13 mole) of 5-nitrofuryl-2-acrylonitrile in 300 milliliters of methanol there was slowly added, with stirring, 0.156 mole (20 percent excess) of free hydroxylamine in dry methanol, while maintaining the temperature of the mixture at 0° C. The resulting reaction mixture was allowed to stand at room temperature for 24 hours, after which time a yellow precipitate which had formed was removed from the reaction mixture by filtration. After recrystallization from hot methanol, the 5-nitrofuryl-2-acrylamidoxime precipitate was found to have a melting point of 220° C. The yield of product was 15.7 grams, corresponding to 62 percent of theory.

*Example III*

To a solution of 76 grams (0.4 mole) of 5-nitrofuryl-2-carbohydroxamyl chloride dissolved in 250 milliliters of dry diethyl ether and maintained at 0° C., were added 74.5 grams (0.8 mole) of aniline dissolved in the same solvent. The resulting mixture was left at room temperature overnight and then evaporated to dryness. The resulting residue was washed with water to eliminate aniline hydrochloride, and then recrystallized from ethanol. The recrystallized product 5-nitrofuryl-2-N-phenylamidoxime weighed 94 grams, corresponding to a yield of 95 percent of theory, and had a melting point of 188° C. and the following analysis:

Calculated for $C_{11}H_9N_3O_4$: C, 53.44; H, 3.64. Found: C, 53.70; H, 3.73.

*Example IV*

Using the procedure of Example III, 76 grams (0.4 mole) of 5-nitrofuryl-2-carbohydroxamyl chloride was reacted with 85.6 grams (0.8 mole) of benzylamine to produce 90 grams (86 percent yield) of 5-nitrofuryl-2-N-benzylamidoxime having a melting point of 98° C. and the following analysis:

Calculated for $C_{12}H_{11}N_3O_4$: C, 55.16; H, 4.21. Found: C, 54.89; H, 4.55.

*Example V*

To a solution of 7.3 grams (0.1 mole) of butylamine dissolved in dry benzene were added, in small portions, 9.5 grams (0.05 mole) of 5-nitrofuryl-2-carbohydroxamyl chloride. The resulting mixture was allowed to stand overnight at 5° C. and then washed with water to remove butylamine hydrochloride. The washed reaction product was then extracted with three 20 milliliter portions of 2 N HCl and the resulting acid solution was evaporated to dryness at reduced pressure until all odor of HCl had disappeared. The solid residue consisting of 5-nitrofuryl-2-N-butylamidoxime hydrochloride was dissolved in chloroform and reprecipitated by adding petroleum ether. The yield of hydrochloride product was 6 grams, corresponding to a yield of 46 percent of theory, having a melting point of 100° (with decomposition). The hydrochloride was dissolved in water and 5-nitrofuryl-2-N-butylamidoxime was crystallized from the resulting solution by slowly adding dilute sodium bicarbonate. The amidoxime product had a melting point of 66° C. and the following analysis:

Calculated for $C_9H_{13}N_3O_4$: C, 47.57; H, 5.72. Found: C, 47.69; H, 5.67.

*Example VI*

Using the procedure of Example V, 5.3 grams (0.1 mole) of allylamine and 9.5 grams (0.05 mole) of 5-nitrofuryl-2-carbohydroxamyl chloride were reacted to produce 6 grams (50 percent yield) of 5-nitrofuryl-2-N-allylamidoxime hydrochloride which, upon recrystallization from a mixture of acetone and petroleum ether, had a melting point of 127° C. (with decomposition), and analyzed as follows:

Calculated for $C_8H_9N_3O_4$·HCl: C, 38.80; H, 4.44. Found: C, 39.06; H, 4.05.

*Example VII*

Using the procedure of Example V, 11 grams of diethylamine (0.15 mole) and 14 grams of 5-nitrofuryl-2-carbohydroxamyl chloride (0.075 mole) were reacted to produce 10 grams (50 percent yield) of 5-nitrofuryl-2-N,N-diethylamidoxime hydrochloride which, upon recrystallization from a mixture of acetone and petroleum ether, had a melting point of 120° C. (with decomposition), and the following analysis:

Calculated for $C_9H_{13}N_3O_4$·HCl: C, 40.98; H, 5.31. Found: C, 41.00; H, 5.24.

Our novel compounds are useful as chemical intermediates and as pesticides, particularly as broad-spectrum bactericides.

As representative, the following compounds were tested against a variety of bacteria.

Compound 1.—5-nitrofuryl-2-amidoxime:

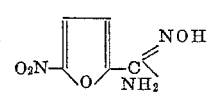

Compound 2.—5-nitrofuryl-2-N-phenylamidoxime:

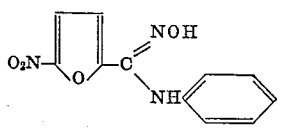

Compound 3.—5-nitrofuryl-2-N-benzylamidoxime:

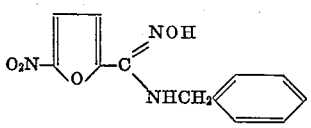

Compound 4.—3-(5-nitrofuryl-2)acrylamidoxime:

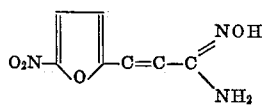

Unless otherwise noted, the test compounds were formulated by dissolving one gram of compound in 50 milliliters of acetone in which had been dissolved 0.1 gram (10 percent of the weight of compound) of "Triton X-155," an alkylphenoxy polyethoxyethanol surfactant, as an emulsifying or dispersing agent. The resulting solution was mixed into 150 milliliters of water to give roughly 200 milliliters of an emulsion containing the compound in finely divided form. The thus-prepared stock suspension contained 0.5 percent by weight of compound. The test concentrations employed in the tests described hereinbelow were obtained by diluting the stock suspension with water.

In a series of agar incorporation tests, test nutrient agar plates were prepared by dissolving 8 grams of Difco Bacto nutrient broth and 15 grams of Difco Bacto agar in 1000 milliliters of distilled water. This medium was divided into 18 milliliter aliquots in 50 milliliter Erlenmeyer flasks which were then autoclaved for 20 minutes, and allowed to cool to 50° C.–60° C. Two milliliters of the test solution obtained by diluting the stock suspension and containing test compound at the indicated concentration was then added to the flasks. The contents of the flask were agitated and immediately poured into sterile Petri plates. After solidification of the agar, one transfer loop of a bacterial colony, prepared by culturing the test organism on nutrient agar for one week at controlled conditions of 20° C. and pH 7.0, was gently streaked on the agar surface and the inoculated agar was incubated at 20° C. for two days. After this time, the ability of the test compound to inhibit bacterial growth was visually rated on a relative basis of 1 (no control) to 5 (complete inhibition). The results are set forth in Table I, below.

TABLE I

| | Concentration of Compound (p.p.m.) | Bactericide Rating | | | | |
|---|---|---|---|---|---|---|
| | | $S. a.^1$ | $B. m.^2$ | $P. a.^3$ | $C. m.^4$ | $L. p.^5$ |
| Compound 1 | 250 | 5 | 5 | 5 | 5 | 5 |
| | 60 | 5 | 5 | 1 | 5 | 3 |
| | 15 | 5 | 5 | 1 | 5 | 5 |
| | 4 | 5 | 5 | 1 | 5 | 5 |
| | 1 | 1 | 5 | 1 | 1 | 1 |
| | 0.25 | 1 | 5 | 1 | 1 | 1 |
| Compound 2 | 100 | 5 | 5 | 1 | 1 | 5 |
| | 25 | 5 | 5 | 1 | 1 | 1 |
| | 6 | 5 | 5 | 1 | 1 | 1 |
| Compound 3 | 100 | 5 | 5 | 1 | 1 | 3 |
| | 25 | | | | | |
| | 6 | | | | | |
| Compound 4 | 100 | 5 | 5 | 1 | 5 | 5 |
| | 25 | 5 | 5 | 1 | 5 | 3 |
| | 6 | 5 | 5 | 1 | 5 | 1 |
| | 1.5 | 5 | 5 | 1 | 1 | 1 |
| | 0.38 | 5 | 5 | 1 | 1 | 1 |
| Control | | 1 | 1 | 1 | 1 | 1 |

[1] *Staphylococcus aureus* var. *pyogenes*.
[2] *Bacillus mesentericus*.
[3] *Pseudomonas aeruginosa*.
[4] *Corynebacterium michiganense*.
[5] *Lactobacillus plantarum*.

In another series of agar incorporation tests carried out as described above, the activity of 5-nitrofuryl-2-amidoxime (Compound 1) against a variety of plant pathogens was determined. The results are summarized in Table II, below.

TABLE II

| Concentration of Compound (p.p.m.) | Bactericide Rating | | | | |
|---|---|---|---|---|---|
| | $E. a.^1$ | $X. p.^2$ | $P. s.^3$ | $A. t.^4$ | $X. ph.^5$ |
| 250 | 5 | 5 | 5 | 5 | |
| 125 | 5 | 5 | 5 | 5 | |
| 62 | 5 | 5 | 2 | 5 | |
| 50 | 5 | 5 | 1 | 5 | 5 |
| 25 | 5 | 5 | 1 | 5 | 4 |
| 12 | 5 | 2 | 1 | 5 | 4 |
| 6 | 5 | 1 | 1 | 5 | 3 |
| 3 | 5 | 1 | 1 | 1 | |
| 0 | 1 | 1 | 1 | 1 | 1 |

[1] *Erwinia amylovora* (fireblight).
[2] *Xanthomonas pruni* (peach leaf spot).
[3] *Pseudomonas syringae* (canker of stone fruit).
[4] *Agrobacterium tumefaciens* (crown gall).
[5] *Xanthomonas phaseoli* (bean blight).

Our compounds are particularly efficacious when applied against plant pathogenic bacteria in that they exhibit little or no phytitoxicity. A suspension of 5-nitrofuryl-2-amidoxime containing 500 p.p.m. of compound (obtained by diluting the stock suspension with water) was sprayed on bean plants, peach trees, apple trees, and applie seedlings. No phytotoxic effects were observed except in the case of bean plants where slight chlorosis was noted.

Control of crown gall disease caused by *Agrobacterium tumefaciens*, a soil-borne organism, was further demonstrated in greenhouse tests using tomatoes as the test crop. Four-week old tomato plants (Bonny Best var.) were inoculated with a water suspension of a two-week old culture of *A. tumefaciens* grown on standard potato dextrose agar medium. The density of the inoculum was adjusted to 40 percent transmission when measured with a colorimeter at a wavelength of 530 m$\mu$. The lowermost node of each plant which was situated about two inches above the soil line was inoculated with 0.01 ml. of the bacterial suspension using a hypodermic needle and syringe. Fifty ml. each of a 500 and 250 p.p.m. formulation of 5-nitrofuryl-2-amidoxime, obtained by diluting a stock formulation with water, were drenched onto the soil in four inch pots containing the inoculated plants one hour and again ten days after inoculation. Suitable control plants were inoculated in identical manner as the test plants but were drenched with the above formulation minus the toxicant. Disease ratings were visually estimated, based on the control, and graded 1 (galling as in control) through 5 (no galling).

Because the plants were inoculated at a node above the soil line while the toxicant was drenched into the soil, any control derived from such treatment would have to come from toxicant translocated to the point of inoculation.

The results are set forth in Table III.

TABLE III

| Concentration of Compound | Rating | |
|---|---|---|
| | Replicate 1 | Replicate 2 |
| 500, p.p.m. | 5 | 4 |
| 250, p.p.m. | 1 | 1 |
| Control | 1 | 1 |

The compounds of this invention may be used to combat plant pathogenic bacteria according to methods known to those skilled in the art. Bactericidal compositions containing the active toxicant will usually include a liquid carrier or diluent, such as water, petroleum distillates, other liquid carriers or solid carriers of diluents such as clay, talc, bentonite, diatomaceous earth and the like. The choice of dispersing, emulsifying and sticking agents and the amount employed is dictated by the nature of the composition and the ability of the agent to facilitate the dispersion of the toxicant. Generally, it is desirable to use as little of the agent as possible. Nonionic, anionic, or cationic dispersing and emulsifying agents may be employed. The amount of toxicant in such formulations may vary from 100 to 500 parts per million and is sprayed with appropriate spray equipment directly onto the foliage of plants until runoff.

Similar formulations can be used to treat soil wherein plant pathogenic bacteria such as *Agrobacterium tumefaciens* are present to prevent development of disease, particularly crown gall. Such control measures would be particularly suitable in treatment of nursery stock susceptible to crown gall. The toxicant formulation may be drenched into the soil environment wherein susceptible nursery plants are stored at rates varying between about 50 and 100 pounds per acre or applied with irrigation water at rates of from about 500 to 1000 parts per million.

The broad-spectrum activity of the compounds of this invention was further investigated in a series of antibiotic disc tests. An aqueous solution of test compound was incorporated into 5 millimeter antibiotic discs at a rate of 50 micrograms of compound per disc, dried, and then placed on nutrient agar previously seeded with bacteria. After 96 hours of incubation at 25° C., the results were observed and are expressed as the average diameter of zones of inhibition (i.e., zone in which the growth of bacteria is inhibited) for each bacterium. Observations were also made for circular zones of resistant bacterial colonies appearing within the zone of inhibition. For purposes of comparison, a proprietary material known to the trade as "Furadantin," [N - (5-nitro-2-furfurylidene)-1-aminohydantoin], was tested side-by-side with the compound representative of this invention, 5-nitrofuryl-2-amidoxime. The results are set forth in Table IV, below.

TABLE IV

| Compound | Zones of Inhibition (in millimeters) | | | | | | |
|---|---|---|---|---|---|---|---|
| | C. m.[1] | X. p.[2] | P. p.[3] | X. ph.[4] | A. t.[5] | E. a.[6] | P. t.[7] |
| 5-nitrofuryl-2-amidoxime | [8]29 | 18 | 33 | 25 | 25 | 30 | 18 |
| Furadantin | 16 | 0 | [9]30 | 0 | 0 | 0 | 0 |
| Control | 0 | 0 | 0 | 0 | 0 | 0 | 0 |

[1] *Corynebacterium michiganense* (bacterial canker of tomato).
[2] *Xanthomonas pruni* (peach leaf spot).
[3] *Pseudomonas phaseolicola* (halo blight of bean).
[4] *Xanthomonas phaseoli* (common bean blight).
[5] *Agrobacterium tumefaciens* (crown gall).
[6] *Erwinia amylovora* (fireblight).
[7] *Pseudomonas tabaci* (wildfire of tobacco).
[8] Denotes zone of inhibition with resistant circular bacterial colonies appearing.
[9] Average diameter of zone of inhibition (mm.) of three replicates.

The outstanding value as antibiotics of our compounds was further substantiated in antibiotic disc tests against resistant races of *Staphylococcus aureus*. These tests were carried out in a manner similar to the previously described disc test, but using the concentrations indicated in Table V, which sets forth the results of these tests.

TABLE V.—ACTIVITY OF COMPOUNDS 1 AND 4 AGAINST ANTIBIOTIC RESISTANT RACES OF STAPHYLOCOCCUS AUREUS[1]

| Compound | Conc., μg./disc | Race A | Race B | Race C | Race D |
|---|---|---|---|---|---|
| 1 | 30 | 32.0 | 26.0 | 32.0 | 34.6 |
| | 10 | 17.6 | 16.0 | 18.6 | 25.6 |
| | 5 | 0.0 | 5.0 | 13.5 | 18.0 |
| 4 | 30 | 46.0 | 37.6 | 45.6 | 50.6 |
| | 10 | 33.0 | 33.0 | 40.0 | 40.6 |
| | 5 | 29.0 | 28.0 | 33.0 | 34.6 |
| Streptomycin | 30 | 0.0 | 14.0 | 22.6 | 0.0 |
| | 10 | 0.0 | 12.0 | 19.0 | 0.0 |
| | 5 | 0.0 | 3.0 | 17.0 | 0.0 |
| Control | | 0.0 | 0.0 | 0.0 | 0.0 |

[1] Average diameter of zone of inhibition, in millimeters, based on three replicates.

RACE A was isolated from a tracheal aspiration of a patient with a clinical impression of pneumonia and was resistant to achromycin, streptomycin, chloromycetin, penicillin, and kanamycin.
RACE B was isolated from an infected pylostomy site and was resistant to streptomycin, penicillin, and erythromycin.
RACE C was isolated from a throat culture of a child with a clinical impression of rheumatic fever and was resistant to streptomycin and penicillin.
RACE D was isolated from a carbuncle and was resistant to achromycin, streptomycin, and erythromycin.

The specific modes in which the antibiotic action of our compounds can be utilized will be apparent to those skilled in the art and may involve solution in water to form aqueous antiseptics or may provide antibiotic tinctures, antiseptic means and ointments, etc. Such compositions can be applied to sterilize hospital equipment and the like, either to prevent infection by the bacterium or to combat bacteria existing on the locus to be protected, or to combat topical infection.

What is claimed is:
1. 5-nitrofuryl-2-N-butylamidoxime.
2. 5-nitrofuryl-2-N,N-diethylamidoxime.
3. 5-nitrofuryl-2-N-allylamidoxime.
4. 5-nitrofuryl-2-N-phenylamidoxime.
5. 5-nitrofuryl-2-N-benzylamidoxime.
6. 5-nitrofuryl-2-acrylamidoxime.

References Cited

UNITED STATES PATENTS

| | | |
|---|---|---|
| 2,703,324 | 3/1955 | Binkley et al. ____ 260—347.7 X |
| 2,861,919 | 11/1958 | Gilbert _____ 167—33 |
| 2,974,084 | 3/1961 | Mayhew et al. _____ 167—33 |
| 2,995,582 | 8/1961 | Garber et al. _____ 260—347.7 |
| 3,024,252 | 3/1962 | Engster et al. _____ 260—347.7 |

HENRY R. JILES, *Primary Examiner.*

NICHOLAS S. RIZZO, WALTER A. MODANCE,
*Examiners.*